United States Patent [19]

Johnson et al.

[11] Patent Number: 4,637,643
[45] Date of Patent: Jan. 20, 1987

[54] AUTO-RELEASE LOGGING CHOKER

[75] Inventors: David D. Johnson, Booth; Cleveland J. Biller, Morgantown, both of W. Va.

[73] Assignee: The United States of America as represented by the Secretary of Agriculture, Washington, D.C.

[21] Appl. No.: 794,028

[22] Filed: Nov. 1, 1985

[51] Int. Cl.$^4$ .......................... B66C 1/38; F16F 15/06
[52] U.S. Cl. .................................. 294/75; 294/82.11; 294/82.14; 294/110.1; 294/116
[58] Field of Search ............. 294/75, 74, 82.11, 82.24, 294/82.25, 82.27, 86.17, 86.18, 86.19, 86.20, 86.27, 86.28, 86.29, 86.30; 294/86.31, 86.32, 86.33, 88, 110.1, 113, 115, 116

[56] References Cited

U.S. PATENT DOCUMENTS

| | | |
|---|---|---|
| 2,476,734 | 7/1949 | Jellison . |
| 2,823,379 | 2/1958 | Novak . |
| 3,081,122 | 3/1963 | Jungersen . |
| 3,104,906 | 8/1960 | Adams . |
| 3,116,663 | 1/1964 | Musgrave . |
| 3,260,546 | 7/1966 | Stack . |
| 4,258,888 | 3/1981 | Sawn . |
| 4,293,155 | 10/1981 | Grant . |
| 4,358,144 | 11/1982 | Schmidt et al. . |

FOREIGN PATENT DOCUMENTS 138543 10/1981 Japan ...................................... 294/75

Primary Examiner—James B. Marbert
Attorney, Agent, or Firm—M. Howard Silverstein; David G. McConnell

[57] ABSTRACT

A self-releasing coupling includes a casing body (14) to which is attached a cap portion (16) and in which a grasping mechanism (50) is movably positioned. The grasping mechanism includes grapple arms (80) rockably mounted on a piston (52) and held thereon by a snap ring (112). Springs (120, 124) bias the piston forward and aft of the casing body and a cap shoulder (28) and keys (42) move the snap ring forward and aft of grapple arm fulcrums (86) to bias the grapple arms into an element grasping or into an element releasing-/receiving configuration. Each grapple arm includes a ramp (142) which engages a chamfer (150) on a casing seating shoulder (40) to increase the grasping force on an element as the pull or tension on that element increases. The snap ring is moved into a grapple arm opening position while the grapple arm is grasping the element and aprons (144) on the grapple arms engage a surface (150) on the casing to maintain the grapple arms in grasping engagement with the element to counter the bias of the snap ring in this mode to the device.

12 Claims, 7 Drawing Figures

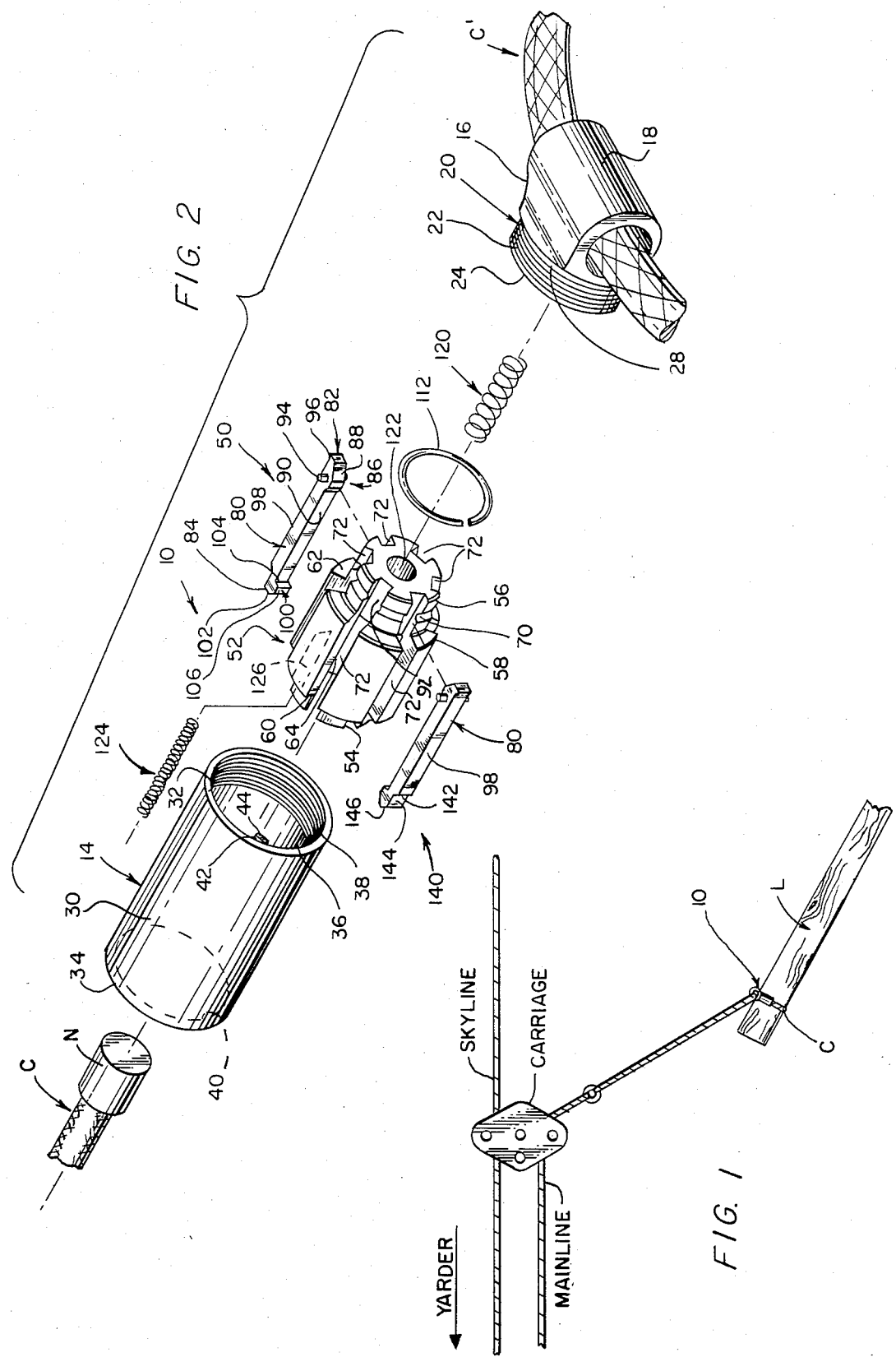

AUTO-RELEASE LOGGING CHOKER

Description

1. Technical Field

The present invention relates in general to fastening mechanisms which release automatically upon relaxation of tension forces on an element attached to the mechanism. More specifically, this invention is related to such mechanisms used in logging operations, such as a self-releasing choker means.

2. Background Art

In most logging operations, felled logs are hauled using a cable noose attached to the log. Such nooses are called choker cables, and are applied by a chokesetter. The choker cable usually includes a nub on an end thereof and is fastened to itself using a self-releasing choker mechanism. The chokesetter inserts the cable nub into the choker mechanism which locks onto that nub. A yarder operator is then signalled to pull in the log. Once the log is moved to its destination, tension on the choker cable is released, and the choker mechanism must be released. The releasing operation is performed by a chaser.

The releasing step is often a time-consuming and possibly hazardous task. Self-releasing choker mechanisms have therefore been proposed in order to economize and expedite this releasing operation by making it safer and automatic whereby the need to hire a chaser can be elminated.

While self-releasing mechanisms are well known, see e.g., U.S. Pat. No. 3,081,122, such mechanisms are not suitable for use in logging situations due to their complexity. These mechanisms often have many cooperating elements which may become damaged or soiled in a logging or forestry operation. A damaged or soiled mechanism may not operate correctly and may not be able to accomodate different size cables, and thus may be inefficient in some circumstances and inoperative in others. Furthermore, many of these devices are not held in an attaching configuration in a reliable manner, and also may require much manual effort to connect a load.

Accordingly, self-releasing mechanisms have been designed specifically for logging operations, see e.g., U.S. Pat. Nos. 3,104,906, 3,260,546, 4,293,155 and 4,358,144. Devices such as the one disclosed in U.S. Pat. No. 4,358,144 require little manual effort to attach a load; but often are quite complex. Not only does this complexity present the abovementioned problems, it makes the device expensive to purchase, as well as difficult and expensive to service and repair. Many of the elements of these devices may be quite specific to the device itself and thus repair operations may require ordering specific parts and thus may be delayed until a new part is received. Stocking spare parts can be expensive and impractical. Furthermore, these devices may be all but impossible to service in the field due to their complexity, their complicated assembly as well as the specificity of their elements.

However problematical the above-discussed drawbacks are, they are not nearly as impedimentary to the acceptance of such mechanisms as is the drawback associated with their lack of ability to reliably ensure the secure capture of the cable while also reliably ensuring rapid and easy release of that cable when suitable. These devices often have stop ledges or the like which engage the cable grasping jaws. Due to wear and tear, these types of engaging devices may permit play between the edges and the grasping arms whereby the security of cable capture is inhibited. Furthermore, if dirt or the like becomes lodged on the ledges, the overall operation of the device may be hindered, altered or even prevented in some instances.

The known devices, furthermore, often do not have a coaction of elements such that elements are used as effeciently as possible. Thus, for example, the elements used to close these devices generally are not used, and in some cases must actually be overridden to open the device. Not only does this characteristic result in increasing the number of elements required by these devices, it may increase the wear and decrease the reliability of those elements. Stated another way, the closing and opening modes of these devices are often interrelated in a manner which requires overriding action of the elements associated with one mode when placing the device in the other mode. For example, the device disclosed in the above-mentioned U.S. Pat. No. 4,358,144 includes a spring biasing the gripping jaws thereof into a closed configuration at all times during the operation of the device. Thus, this biasing force must be overridden by the operation of another element in the device to open the device during a cable releasing operation. Other devices are biased open and must include elements to override the opening elements to close the device. The extra elements, in addition to causing the drawbacks mentioned previously, add to the overall cost of purchasing and/or repairing the device. The large number of elements required also causes these coupling devices to be large and cumbersome to handle, carry and store. Accordingly, there is need for a self-releasing coupling device which is inexpensive, compact and makes efficient use of its component elements while also being extremely reliable yet easy to use and service.

DISCLOSURE OF THE INVENTION

It is a main object of the present invention to provide a new and improved self-releasing coupling in which there is an operation enhancing co-action of elements during both opening and closing operations of the device.

It is another object of the present invention to provide a new and improved self-releasing coupling in which tension applied to an element attached to the coupling assists in the closing operation of the coupling.

It is another object of the present invention to provide a new and improved self-releasing coupling which is suitable for use in logging operations such as for a choker mechanism or the like.

It is another object of the present invention to provide a new and improved self-releasing coupling in which at least one element used to effect opening of the coupling is used to effect closing of the coupling whereby the overall result produced by the device exceeds the result producible using the sum of the individual elements.

It is another object of the present invention to provide a new and improved self-releasing coupling which includes a casing having a body portion and a cap portion as well as a grasping means having a piston movably mounted in the casing with grapple arms mounted on the piston for movement therewith and toward and away therefrom. A biasing means operates the grapple arms and biasing means are mounted on the piston to engage the casing. Each of these elements performs more than one function and therefore the overall coupling is capable of producing results which cannot be produced by the mere sum of the individual elements.

It is another object of the present invention to provide a new and improved self-releasing coupling in which a casing portion not only encases the operating elements, but forms stop means as well; a plurality of grapple arms not only grasp an element but function to increase the grasping force as tension on the element is increased and to further control the opening operation of the device; a snap ring which not only serves as a biasing means to open the coupling but also serves as a biasing means to close the coupling onto the element; a first compression spring which not only serves to bias the coupling elements into a grasping location but also assists in the ejection of a released element from the coupling; a plurality of second compression springs which not only serve to bias the coupling elements into an opening location but also absorbs shocks of initial loading to prevent jolting the casing, and cooperating channels and keys which not only accommodate each other to guide and control coupling element movements, but also control and accomodate other elements.

It is another object of the present invention to provide a new and improved self-releasing coupling which utilizes simple springs, ramps, channels, grooves and projections to accomplish the overall results whereby a compact, inexpensive and simple device is provided.

It is another object of the present invention to provide a new and improved self-releasing coupling in which a casing is formed of a tubular body portion and a cap portion which are releasably coupled together. The remainder of the elements are mounted on a grasping means movably mounted within the casing whereby the coupling device is easily disassembled with all elements being exposed for easy access for maintenance or the like and easily reassembled.

It is another object of the present invention to provide a new and improved self-releasing coupling in which transient relaxations in pull on the element being grasped by the coupling are prevented from activating the self release function of the coupling.

BRIEF DESCRIPTION OF THE DRAWINGS

FIG. 1 shows a self-releasing coupling embodying the present invention being used to fasten a cable around a log;

FIG. 2 is an exploded perspective of the coupling embodying the present invention.

BEST MODE FOR CARRYING OUT THE INVENTION

Figure 3A:
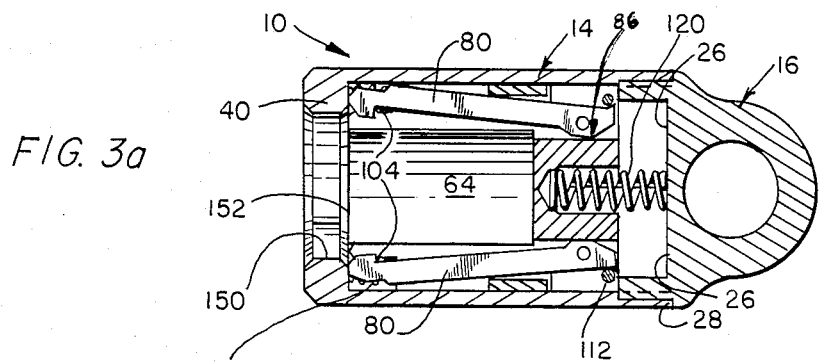
FIGS. 3a-3e are cut-away elevations showing the coupling embodying the present invention in various phases of its overall operation.

Referring in detail to the drawings, a typical choker assembly is shown in FIG. 1 where a log L is being hoisted or dragged using a choker. The choker includes a choker cable C fastened to itself around the log by means of a self-releasing coupling 10 which is the subject of the present disclosure. However, the coupling 10 need not be located in the choker, but can be located in any other location, such as to connect the choker cable C to another line, such as the mainline shown in FIG. 1. In fact, the coupling 10 can be used in other applications wherein a first element is to be attached to a second element and separating force tending to defeat such attachment is present without departing from the scope of the invention. The forestry/choker application is preferred and thus will be used in this disclosure. Once the choker is secured, tension or pull is applied to the choker cable, and that cable cinches up around the log and the log can then be pulled to a desired location. As used herein, the term "separating force" includes the aforementioned tension or pull applied to the choker cable. Next, tension is released from the choker, and that choker unhooked. The choker can then be returned to the woods to be used again.

Adverting next to FIG. 2, the choker cable C has a nub N located on a terminal end thereof which is grasped by the coupling 10 for attaching that end to another element, such as cable C' which also is attached to the coupling 10. The coupling 10 includes a casing having a tubular body portion 14 which receives nub N and a cap portion 16 to which cable C' is attached via an ear 18 and which is threadably connected to the body portion 14 for attaching cables C and C' together.

The cap portion ear is shaped to accommodate cable C' without damaging such cable and therefore has a curvature and rounded corners as is usual to such an element. The cap portion further includes a neck portion 20 which is in the form of a blind-ended tube. The neck portion therefore has a wall on which external threads 22 are defined and which forms an annular shoulder 24 at the terminus thereof. The neck portion includes a bottom 26 (shown in FIG. 3a) and a first stop means which includes an external shoulder 28, the purposes of which will be discussed later.

The body portion 14 is tubular and therefore includes a wall 30 having an annular aft terminal end 32 and fore terminal end 34. The wall includes an inner surface 36 having threads 38 defined thereon for cooperable association with threads 22 of the cap portion to bring end 32 of the body into abutting contact with shoulder 28 of the cap portion whereby the body and cap portions are coupled together in the desired orientation and spacing. In this coupled configuration, the cap portion annular shoulder 24 will be located internally of the casing and will project radially inwardly thereof to form a first stop means, the purposes of which will be discussed below. Terminal end 34 extends radially inward of the body portion to define a seating shoulder 40, and a plurality of keys 42 are located on body inner surface 36 to extend longitudinally of the body and to project radially inward of that body. Preferably, there are three equally spaced apart keys 42; however, one key is shown in FIG. 2 for the sake of convenience.

Each of the keys includes a second stop means having an aft terminal end 44. The key aft ends are located on the wall inner surface to cooperate with the first stop means formed by the cap portion shoulder 24 to provide results discussed below.

The coupling 10 further includes a grasping means 50 movably positioned within the coupled cap and body portions. The grasping means is adapted to be moved between various locations within the casing and is further adapted to assume a closed element grasping configuration and an open element releasing/receiving configuration.

The grasping means 50 includes a piston 52 having a fore end portion 54 and an aft end portion 56 connected together by a central portion 58. The central portion is radially offset from the two end portions to define a piston fore shoulder 60 and a piston aft shoulder 62. The piston fore and central portions are hollow with the aft end portion forming a blind end for a blind-ended bore 64 defined by those hollow portions for accommodating cable nub N which will abut the blind end of the bore to move the grasping means aft of the casing when desired to operate the coupling 10.

The piston aft end portion 56 includes a circumferentially disposed groove 70, and a plurality of channels 72 extend longitudinally of the piston from aft of the groove 70 to fore end portion 54 of the piston. Each key 42 is positioned to be received with a corresponding channel on the piston in a key-keyway type combination whereby piston sliding movement is permitted and guided. The grasping means further includes a plurality of identical grapple arms 80, each mounted on the piston in one of the channels 72. In the preferred embodiment, there are six such arms. Each grapple arm includes an aft end 82 and a fore end 84 with a fulcrum 86 located adjacent to the aft end 82. Each fulcrum includes a hill-like protuberance 88 located on an inner surface 90 of the arm to engage a channel bottom 92 in a rocking manner whereby the grapple arm fore end 84 can be rocked toward and away from the piston in a direction radial of the piston. Each fulcrum further includes a pivot pin 94 located adjacent to protuberance 88 to be received in the groove 70 whereby the aforementioned grapple arm rocking movement is permitted but movement of the grapple arm longitudinally of the piston is prevented. The groove 70 and channels serve to guide and control movement of the grapple arms. A projection 96 is located on outer surface 98 at the aft end thereof for a purpose to be discussed below.

Each of the grapple arms includes a head 100 on inner surface 90 adjacent to the fore end thereof. Each head 100 includes a lead-in ramp 102 and a seating ledge 104 connected by a cable engaging surface 106. The lead-in ramp and the seating ledge extend from the grapple arm inner surface and the cable engaging surface extends in the general direction of that inner surface. The lead-in ramp can be used to smoothly guide the cable nub N into the piston bore 64, and the seating ledge grasps that nub adjacent to the cable for holding the cable attached to the coupling 10.

An operating means holds the graple arms in the channels and functions to rock those arms about their fulcrums to move the fore ends thereof toward and away from the piston. The grapple arm will assume an element grasping configuration when the fore end of that grapple arm is located immediately next to the channel bottom 92, and an element releasing/receiving configuration when grapple arm is therefore spaced radially away from the channel bottom.

The operating means includes a snap ring 112 positioned around the grapple arms adjacent to the aft ends thereof and forward of the projection 96 to engage each arm outer surface adjacent to the fulcrum 86. The snap ring is adapted to be moved from a first position forward of the pivot pins between those pins and the arm fore ends whereby the arms are biased to place the arm fore ends in an element grasping configuration to a second position aft of the pivot pins between those pins and projection 96 whereby the arms are biased to rock the fore ends thereof away from the piston and place them in element releasing/receiving configurations.

The snap ring attaches the grapple arms to the piston for movement therewith and is located and sized to be engaged by the first and second stop means whereby that ring is moved between the above-mentioned first and second positions as the piston moves in the casing. The purpose of such operation will be apparent from the ensuing discussion regarding operation of the coupling 10. Accordingly, the first and second stop means will be referred to hereinafter as control means for the operating means because those stop means control the location of the snap ring.

The piston can be moved longitudinally of the bore 64 by means of the cable nub, and by moving means which includes a spring 120 mounted in a blind-ended spring bore 122 defined in piston aft end portion 56 to extend longitudinally of the piston and by springs 124 mounted in blind-ended spring bores 126 defined in the piston central portion 58 to extend longitudinally of the piston from piston fore shoulder 60 aft of the piston. The spring 120 engages cap bottom 26 for biasing the piston forward of the bore 64, and the springs 124 are adapted to engage the seating shoulder 40 to bias the piston aft of the bore 64.

Preferably, there is one spring 120 and three equally spaced springs 124, with the springs 120 and 124 being sized and having spring constants appropriate to the function of the coupling 10. Such function will be apparent from the ensuing discussion of the operation of coupling 10.

The first and second casing stop means are located with respect to each other so that the snap ring is located in the releasing/receiving configuration position when the grasping means is still grasping the cable nub whereby release of the cable nub is rapid and reliable. To counter this, the grasping means includes an engaging force generating means, generally denoted by the reference numeral 140. This force generating means includes a ramp 142 defined on each grappling arm outer surface to extend toward the grappling arm inner surface and a lead-in apron 144 extending longitudinally of the arm and toward the arm fore terminal end. A chamfer 146 connects the apron 144 to the arm fore terminal end and is matched by a chamfer of the seating shoulder whereby contact between the grapple arms and the seating shoulder is smooth and does not produce under jolting of the casing. The slope of ramp 142 matches the slope of chamfer 146 and the slope of the seating shoulder chamfer.

When the cable nub is captured by the grasping means and attempts to move out of the bore 64, the chamfer 146 engages the seating shoulder chamfer to guide the apron onto the seating shoulder inner surface whereby the grapple arm fore end is prevented from moving radially outward away from the nub. As the nub moves further out of the bore 64, the ramp 142 engages the seating shoulder chamfer and a wedging action results. The wedging action produces an engagement between cooperating ramps which generates a cable grasping force from the grapple arms which increases as the force on the nub tending to withdraw or separate it from the coupling 10 increases.

Having described the elements and their interrelationship with each other, attention is next directed to FIG. 3a-3e for a description of the operation of coupling 10.

FIG. 3a shows coupling 10 in the element releasing/receiving configuration also known as an outhaul position. The grapple arms are held in the releasing/receiving configuration by snap ring 112 which is located aft of the fulcrum 86. The snap ring is located adjacent to the first stop means. The spring 120 is seated on cap bottom 26 to maintain the piston positioned with respect to that cap bottom 26 whereby snap ring 112 is not moved into the second position forward of the fulcrum.

Furthermore, spring 120 cooperates with springs 124 to hold the piston centered within the casing.

Figure 3B:
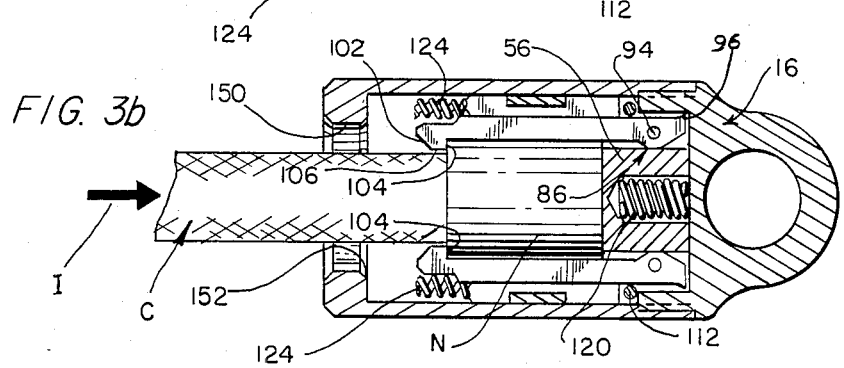

FIG. 3b shows coupling 10 receiving cable nub N. The nub is inserted into the coupling as indicated by arrow I, and is smoothly guided into and centered in the blind-ended bore 64 by the grapple arm lead-in ramps 102. Any misalignment between the cable nub and the coupling is corrected by the action of the grapple arm lead-in ramps 102 and cable engaging surfaces 106 contacting the nub during such insertion, and projection 96 prevents the snap ring from slipping off of the grapple arms. The nub contacts the blind end of bore 64, and further insertion of the nub compresses spring 120 and forces the piston in the aft direction. Snap ring 112 contacts the first stop means and is moved past the fulcrum 86 into a position forward thereof wherein it biases the grapple arm fore ends 84 toward the cable nub. The grapple arm seating ledges 104 hook behind the nub thereby grasping it and attaching the coupling to the cable C.

Figure 3C:
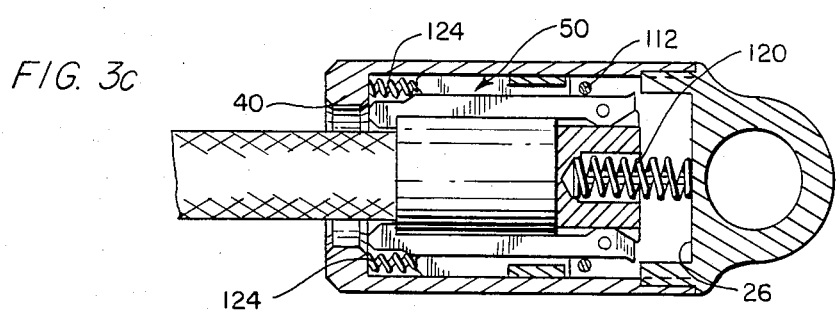

FIG. 3c shows the coupling in a ready mode in which separating force has not yet, or is just being initially applied to the cable. The grasping means 50 is being moved forwardly and outwardly of the casing, and the springs 124 are just contacting the casing seating shoulder 40. In this mode, springs 120 and 124 cooperate to center the piston.

Figure 3D:
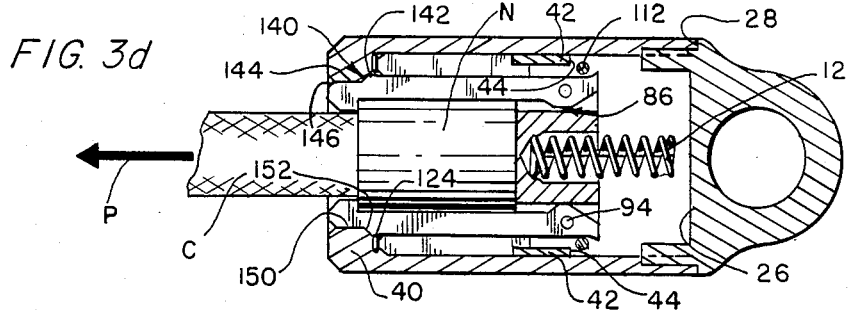

FIG. 3d shows the coupling as pull on the cable is initiated or increased. This pull is represented in FIG. 3d by arrow P which thus also represents tension on the cable or separating force on the cable. This mode is also known as "inhaul". The piston moves outwardly of the coupling and the springs 124 are compressed. The force generating means 140 is moved into position with apron 144 contacting inner surface 150 of the annular seating shoulder 40 to clamp the grapple arms against the cable and nub and to prevent them from opening. The grapple arm ramps 142 engage chamfer 152 on the casing seating shoulder and effect a wedging action whereby closing force exerted on the grapple arms increases as pull on the cable is increased. The ramps 142 and chamfer 152 are sized and oriented to adjust the rate and magnitude of clamping force increase as the magnitude to cable pull is increased whereby the nub is more securely clamped as pull on the cable is increased. The force generating means is also designed so that the nub is not damaged to the degree it will accidentally slip out of the coupling before the cable breaks and various size nubs can be accommodated as the ramp-chamfer will increase clamping pressure until even a small nub is securely grasped. The chamfer 146 on the grapple arms initially contacts the seating shoulder chamfer 152 to smoothly begin the just-discussed force generating process for protecting the casing from damage. Springs 124 also tend to absorb some of this impact to further protect the casing. Such impact absorption also protects cable C' (not shown in FIGS. 3a-3e) which is attached to the cap portion 16 and any element attached to that cable C' which may receive, and be damaged by, such a jolt.

As the coupling moves from the FIG. 3C configuration into the FIG. 3d configuration, the snap ring 112 contacts the second stop means, and is held against further forward movement. The continued forward movement of the piston and grapple arms toward the FIG. 3d configuration moves those grapple arms forward with respect to the immobilized snap ring whereby that snap ring is repositioned from forward of the grapple arm fulcrums, in which those arms are biased closed by the snap ring, to aft of the grapple arm fulcrums, in which those arms are biased open by the snap ring. Therefore, the FIG. 3d configuration of the grasping means is similar to the FIG. 3a releasing/receiving configuration with the grapple arms being biased toward a releasing/receiving configuration.

However, the grasping means in FIG. 3d is at a first location within the casing spaced from the second location thereof in FIG. 3a so that in the FIG. 3d configuration, there is contact between the grapple arm aprons 144 and seating shoulder inner surface 150. Such contact prevents those grapple arms from opening into the releasing/receiving configuration. The coacting ramp 142 and chamfer 152 also can assist in this grapple arm opening preventing function. The springs 124 bias the piston rearwardly of the casing from the FIG. 3d configuration toward the FIG. 3a configuration. However, piston movement caused by this biasing force is prevented by the pull on the cable C. Accordingly, even though coupling 10 is in an element grasping configuration in FIG. 3d, it is ready to immediately assume a release/receiving configuration, and is biased toward that release/receiving configuration. The only thing preventing the coupling from moving into such a configuration is the pull on the cable C and the coaction of engaging force generating means 140 and seating shoulder 40. This condition permits coupling 10 to be able to rapidly and easily release the cable nub, yet due to the action of the engaging force generating means, securely grasp the cable without danger of accidentally releasing that cable due to the just-discussed biasing.

It can also be observed from comparing FIGS. 3b, 3c, 3d and 3e that coupling 10 remains in the grasping configuration during the grasping step (FIGS. 3b and 3c) so that all elements of the coupling assist each other in performing this operation. However, once the coupling begins the element grasping function (FIG. 3d) the snap ring 112 is moved to the opening position so that, when the coupling enters the release mode (FIG. 3e), all of the elements assist each other in the opening procedure. Therefore, the elements of coupling 10 coact with each other in a manner which enhances both the grasping operation and the releasing operation, and none of the elements must be overridden to effect one or the other of these operations, and in fact the snap ring actually assists in both operations.

Figure 3E:
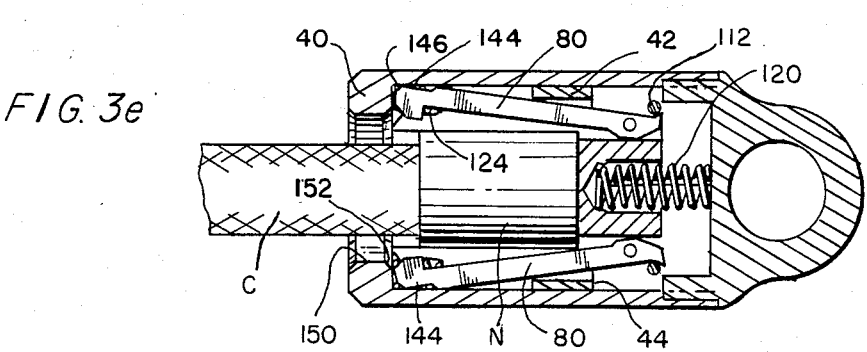

Due to the biasing of the snap ring, the cable unhooking procedure is quite simple, and the cable unhooking or releasing configuration is shown in FIG. 3e. As soon as pull on the cable C is stopped, as indicated in FIG. 3e by the deletion of arrow P, the aforediscussed bias of the moving means springs 124 pushes the piston rearwardly of the casing. As soon as the grapple arm aprons 144 clear the seating shoulder inner surface 150, outward, releasing, movement of the grapple arms begins. Engagement of the grapple arm chamfers 146 with seating shoulder chamfer 152 controls this outward movement to prevent the arms from impacting the casing with force sufficient to damage either the casing or the arms. The frictional forces between the grapple arms 80 and the seating shoulder further controls the rearward movement of the piston whereby such rearward movement, although occurring automatically, is controlled and slowed. Such piston rearward movement control not only assists in preventing damage to the piston by slowing the piston rearward movement, it also prevents slight, transient relaxations in the pull on cable C from allowing the moving means springs 124 to immediately move the piston out of the FIG. 3d element grasping mode. Thus, oscillations in the separating force will not cause accidental release of the cable. The outward bias of the grapple arms caused by the snap ring being in the second position (shown in FIG. 3d) increases this controlling fictional engagement.

Once the grapple arm ramps 146 clear the seating shoulder chamfer 152, the grapple arms are freed to move into the open, or releasing/receiving, configuration due to the bias of snap ring 112. The cable nub is released to be withdrawn from the coupling. The piston is again centered by the coaction of springs 120 and 124, and the spring 120 may exert a slight outward force on the nub to eject that cable nub from the coupling if spring 120 has been compressed during the just-discussed grapple arm releasing step.

From the foregoing description, it will be appreciated that numerous modifications can be made within the teachings of this invention. Hence, the annexed claims are not intended to be limited to the illustrated embodiments.

We claim:

1. A self-releasing coupling for releasably attaching a first element to a second element comprising:
    a casing having attaching means for attaching said casing to the first element, and a ramp;
    grasping means movably mounted in said casing for releasably grasping the second element, said grasping means having wedgelike engaging force generating means thereon which cooperate with said casing ramp for forcing said grasping means toward said second element and providing an engaging force between said grasping means and the second element which maintains said grasping means in engagement with the second element and increases as a separating force tending to separate the second element from said grasping means increases when said grasping means is in a first location within said casing with said casing ramp engaging said wedgelike engaging force generating means;
    operating means on said grasping means for moving said grasping means into and element grasping configuration and into an element releasing/receiving configuration;
    control means on said casing for placing said operating means into an element releasing/receiving configuration while said grasping means is in said element grasping configuration in said first location within said casing, said operating means being prevented from moving said grasping means into said element releasing/receiving configuration by said ramp and said wedgelike engaging force generating means and the separating force; and
    moving means connected to said grasping means for moving said grasping means out of said first location when the separating force is released whereby said engaging force is released and said operating means automatically places said grasping means into said element releasing/receiving configuration.

2. The self-releasing coupling defined in claim 1 wherein said casing ramp includes a first abutting surface and said wedgelike force generating means includes a second abutting surface on said grasping means, said abutting surfaces having lead-in apron portions, said engaging force being maintained substantially constant as the separating force increases when said lead-in apron portions are in abutting contact with each other.

3. The self-releasing coupling defined in claim 2 wherein said grasping means includes a piston, a grapple arm pivotally mounted on said piston, said grapple arm having a fulcrum engaging said piston, and said operating means includes a first spring attaching said grapple arm to said piston and movable to a first position on one side of said fulcrum to place said grasping means in said grasping configuration when said grasping means is in a second location within said casing spaced from said first location, to a second position on another side of said fulcrum to place said grasping means in said releasing/receiving configuration.

4. The self-releasing coupling defined in claim 3 wherein said control means includes a first casing stop means positioned to engage said first spring when said first spring is in said first position on said one side of said fulcrum and before said grasping means moves into said first location from said second location within said casing for moving said first spring to said second position as said grasping means moves to said first location with said casing, and a second casing stop means positioned to engage said first spring for moving said first spring from said second position into said first position as said grasping means moves to said second location within said casing.

5. The self-releasing coupling defined in claim 4 wherein said moving means includes a second spring mounted on said piston to engage said casing when said grasping means is in said first location within said casing and a third spring mounted on said piston to engage said casing when said grasping means is spaced from said first location.

6. The self-releasing coupling defined in claim 5 wherein said casing includes a hollow body portion in which said grasping means is located and a cap portion on which said attaching means is located, said cap portion having a shoulder portion which forms said second casing stop means.

7. The self-releasing coupling defined in claim 6 wherein said second and third springs are sized and located to cooperate with each other to maintain said grasping means located in said second location within said casing after the second element has been grasped but before the separating force is applied to the elements.

8. The self-releasing coupling defined in claim 7 wherein said piston includes a grapple arm receiving channel and a fulcrum receiving groove defined therein.

9. The self-releasing coupling defined in claim 8 further including a spring retaining means on said grapple arm for preventing said first spring from slipping off said grapple arm.

10. The self-releasing coupling defined in claim 1 wherein the first and second elements include portions of a choker cable.

11. The self-releasing coupling defined in claim 10 wherein the coupling forms part of a choker portion of a choker cable.

12. The self-releasing coupling defined in claim 9 wherein the spring force of said first spring is selected and said first casing stop means is positioned so that when said first spring is moved to said second position by said first stop means said first spring exerts sufficient bias on said grapple arms to force said grapple arms against said casing when said grasping means is in said first location whereby frictional engagement occurs between said grapple arms and said casing, said frictional engagement being sufficient to prevent a transient relaxation in the separating force from activating said moving means whereby such transient relaxation will not cause said moving means to place said grasping means in said element releasing/receiving configuration.

* * * * *